May 31, 1938.  W. J. MORRILL  2,119,397
BELT TIGHTENER BASE
Filed April 21, 1936
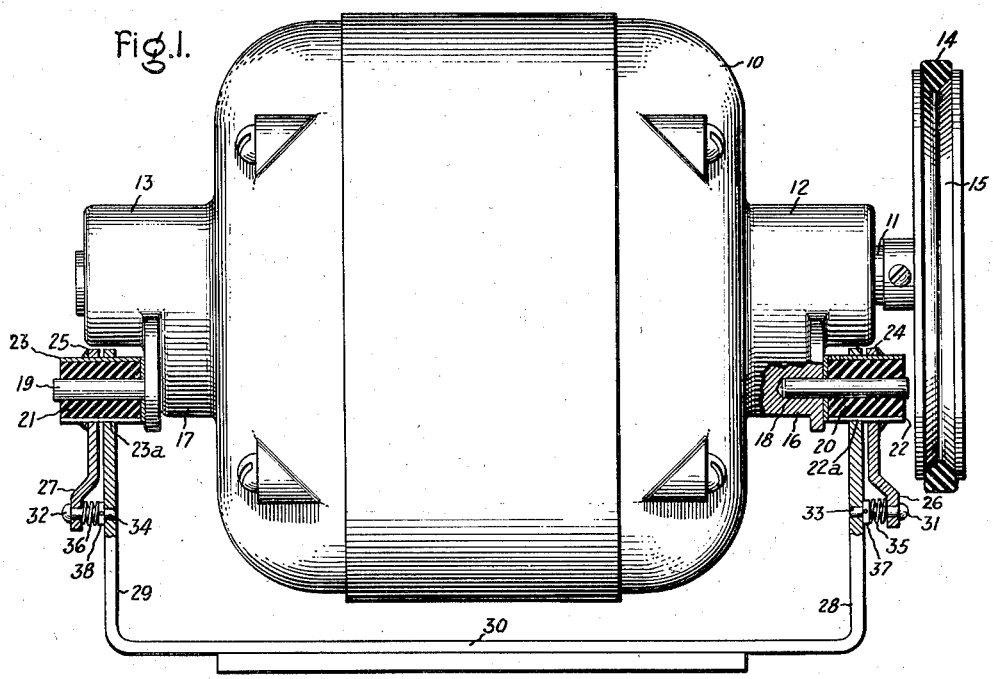
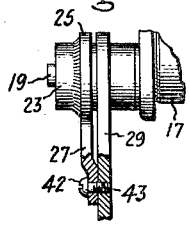
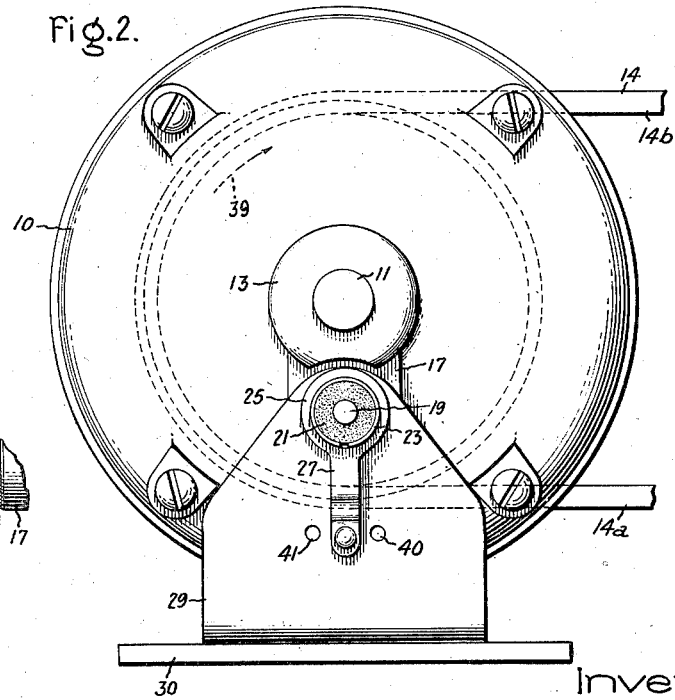
Inventor:
Wayne J. Morrill,
by Harry E. Dunham
His Attorney.

Patented May 31, 1938

2,119,397

UNITED STATES PATENT OFFICE 2,119,397

BELT TIGHTENER BASE

Wayne J. Morrill, Fort Wayne, Ind., assignor to General Electric Company, a corporation of New York Application April 21, 1936, Serial No. 75,588

6 Claims. (Cl. 248—23)

My invention relates to mountings for dynamo-electric machines.

It is often found desirable in dynamo-electric machines to utilize a driving connection which will permit slippage to prevent injury to the dynamo-electric machine under abnormal load conditions, such as occur in starting or during overloads. Friction pulleys and belt drives are often used for such connections and the torque, which can be transmitted through such drives, is a direct function of the friction between the driving contact surfaces. It is generally desirable that a certain amount of slippage should occur in the driving connection when starting and various arrangements have been devised for biasing the driving or driven members for varying the contact friction under these conditions.

An object of my invention is to provide a dynamo-electric machine or the like with a frictional driving connection having an improved and simplified arrangement utilizing a resilient pivotal support for the machine for adjusting the initial or starting friction and wherein the operating friction of the driving connection is varied in accordance with the load transferred by the connection.

Further objects and advantages of my invention will become apparent, and my invention will be better understood, from the following description referring to the accompanying drawing, and the features of novelty which characterize my invention will be pointed out with particularity in the claims annexed to and forming a part of this specification.

For a better understanding of my invention, reference is made to the accompanying drawing, wherein Fig. 1 is a side elevation of a dynamo-electric machine provided with a mounting embodying my invention; Fig. 2 is an end elevation of the support and motor illustrated in Fig. 1 viewed from the end opposite the pulley; and Fig. 3 illustrates a modification of the mounting illustrated in Figs. 2 and 3.

Referring to the drawing, I have shown a dynamo-electric machine having a stationary member 10 and a rotatable member mounted therein on a shaft 11, the ends of which are journaled in hubs 12 and 13. Power is transmitted from the dynamo-electric machine to the driven machine through a flexible frictional driving connection comprising a V-belt 14 which engages a V-grooved pulley 15 mounted on the rotatable shaft 11. The stationary member of the dynamo-electric machine is pivotally supported eccentrically with respect to the axis of the shaft 11, that is, eccentric to the rotational axis of the rotatable member. This pivotal support comprises bosses 16 and 17 on the hubs 12 and 13 having openings in which pins 18 and 19, respectively, are rigidly secured. These pins are mounted in and bonded to resilient bushings 20 and 21 of rubber or the like. The rubber bushings 20 and 21 are tightly fitted in sleeves 22 and 23 which are rotatably fitted in openings 22a and 23a in the arms 28 and 29 of a U-shaped mounting base 30. The sleeves 22 and 23 are welded to rings 24 and 25, which are provided with arms 26 and 27 adjustably secured to arms 28 and 29 of the U-shaped mounting base by pins 31 and 32 extending through openings in the ends of the arms 26 and 27, respectively, and openings 33 and 34 in the upright arms 28 and 29 of the base. The pins 31 and 32 are resiliently urged into engagement with the openings 33 and 34 in the arms by springs 35 and 36, which engage collars 37 and 38 secured to the pins 31 and 32, respectively. The pivotal axis of the motor supporting pins 18 and 19 is parallel to and eccentric with respect to the axis of rotation of the rotatable member of the dynamo-electric machine carried on the shaft 11, and is located at a smaller distance from this rotational axis than the radius of the pulley 15.

During normal operation of the dynamo-electric machine, this resilient supporting arrangement utilizes a displacing force exerted by the belt 14 on the dynamo-electric machine to tension the belt in accordance with the torque transmitted. The driving friction is increased by tightening of the belt 14 when the motor rotates in a clockwise direction as viewed in Fig. 2, and indicated by the dotted arrow 39. Under these conditions, the lower side 14a of the belt 14 will be the tight side and the upper side 14b will be the loose side of the belt. In order to obtain a tightening of the belt, it is, therefore, necessary that the torque about the pivotal axis resulting from the displacing force exerted on the machine by the tight side of the belt be greater than the torque about this axis resulting from the displacing force exerted on the machine by the loose side of the belt. A consideration of these displacing forces in relation to the pivotal axis will indicate that the location of the pivotal axis should be at a lesser distance from the rotational axis of the rotatable member than the radius of the pulley and eccentric with respect to this rotational axis on the driving side of the frictional connection which, in the illustrated embodiment of my invention, is the tight belt side of the pulley. This eccentric arrangement of the pivotal support for the dynamo-electric machine and the particular relation of the pivot to the sides of the belt is not my invention, but is the invention of Wilbur W. Warner, and is described and claimed in his U. S. Patent No. 2,074,135, March 16, 1937 and assigned to the assignee of this application.

With such a pivotal mounting of the dynamo-electric machine, it becomes necessary to provide for maintaining the driving pulley 15 in contact with the belt 14 when the machine is at rest, so that there will be sufficient friction between the pulley and the belt to start the load. It is desirable under such conditions that a certain amount of slippage occur in the frictional driving connection upon excessive load in order to prevent overloading of the machine. In the illustrated embodiment of my invention, I prefer to utilize the force produced by the internal torsional resistance of the resilient bushings 20 and 21 for initially biasing the pulley 15 into engagement with the belt loop by swinging the machine about the pivotal axis through the pins 18 and 19. This torsional resistance is produced by twisting the rubber bushings 20 and 21 by a slight turning movement of the arms 26 and 27 in a direction to tension the belt. Since the pivot pins 18 and 19 are rigidly mounted in the machine frame bosses 16 and 17 and are bonded to the rubber bushings 20 and 21, which are tightly fitted in the sleeves 22 and 23 welded to the arms 26 and 27, a turning movement of the arms in a direction away from the belt loop on the pulley 15 will twist the rubber bushings and produce torsional strain therein. The desired starting friction between the belt 14 and the pulley 15 may be regulated by adjustment of this torsional strain or resistance, and the arms 26 and 27 are retained in position with respect to the upright arms 28 and 29 of the mounting base 30 by inserting the pins 31 and 32 in the central openings 33 and 34 as shown, or openings 40 or 41, in the upright arms of the mounting base.

In assembling the machine mounting, the desired torsional strain in the rubber bushings is obtained by inserting the pivot pins 18 and 19 in the bosses 16 and 17 in a position such that the arms 26 and 27 are angularly displaced in the direction of the belt loop from the position in which they are to be held by the pins 31 and 32 with respect to the upright arms 28 and 29 of the mounting base. Thus a very wide range of biasing forces readily can be obtained by changing the position in which the pivot pins 18 and 19 are inserted in the bosses 16 and 17.

Fig. 3 illustrates another manner in which the arm 27 extending from the ring 25 may be secured to the upright arm 29 of the mounting base 30. In this arrangement, a screw 42 is inserted through the opening in the end of the arm 27 and is threaded into an opening 43 in the upright arm 29. In such an arrangement, adjustment of the biasing force may be obtained, as explained above, by varying the relative position in which the pivot pin 19 is secured in the boss 17.

While I have illustrated and described particular embodiments of my invention as applied to supports for a dynamo-electric machine, it is apparent that modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamo-electric machine or the like having a stationary member and a rotatable member provided with a frictional driving connection adapted to exert a displacing force on said machine, means utilizing said displacing force exerted on said machine by said driving connection for varying the driving friction in said driving connection, said means including a pivotal support for said stationary member eccentric with respect to the rotational axis of said rotatable member, a mounting base, a resilient bushing secured to said pivotal support and rotatably mounted on said mounting base, and means for adjusting and securing said rotatable bushing on said mounting base to bias said stationary member with respect to said driving connection.

2. A dynamo-electric machine or the like having a stationary member and a rotatable member provided with a frictional driving connection, a pivot pin secured to said stationary member, a mounting base, a resilient bushing secured to said pivot pin and rotatably supported on said mounting base, and means including an arm secured to said resilient bushing arranged to adjust the relative position of said bushing with respect to said mounting base utilizing torsional resistance of said resilient bushing for biasing said stationary member with respect to said driving connection and for adjusting the torsion exerted by said resilient bushing.

3. A dynamo-electric machine or the like having a stationary member and a rotatable member provided with a frictional driving connection, a pivot pin rigidly secured to said stationary member, a mounting base, a resilient bushing secured to said pivot pin, a sleeve extending about and secured to said resilient bushing and rotatably supported on said mounting base, and means for adjusting and securing said sleeve to said mounting base against rotation with respect thereto.

4. A dynamo-electric machine or the like having a stationary member and a rotatable member provided with a frictional driving connection, a pivot pin rigidly secured to said stationary member, a mounting base, a resilient bushing secured to said pivot pin, a sleeve extending about and secured to said resilient bushing and rotatably supported on said mounting base, and means including an arm secured to said sleeve arranged to adjust the relative position of said sleeve with respect to said mounting base and utilizing torsional resistance of said resilient bushing for biasing said stationary member with respect to said driving connection and for adjusting the torsion exerted by said resilient bushing.

5. A dynamo-electric machine or the like having a stationary member and a rotatable member provided with a frictional driving connection, a mounting member pivotally connected to said stationary member, a resilient bushing arranged between said mounting member and said stationary member and being rotatably supported with respect to one of said two last-mentioned members and secured with respect to the other of said members, and means for adjusting and securing the position of said bushing to utilize the torsional resistance thereof for initially biasing said stationary member with respect to said driving connection.

6. A dynamo-electric machine or the like having a stationary member and a rotatable member provided with a frictional driving connection, a mounting member, means including a pivotal connection between said stationary member and said mounting member eccentric with respect to the rotatable axis of said rotatable member for varying the friction of said driving connection in accordance with the torque transmitted thereby, said pivotal connection including a resilient bushing arranged between said mounting member and said stationary member and being rotatably supported with respect to one of said two last-mentioned members and secured with respect to the other of said members, and means for adjusting and securing the position of said bushing to utilize the torsional resistance thereof to initially bias said stationary member with respect to said driving connection.

WAYNE J. MORRILL.